United States Patent
Tune et al.

(10) Patent No.: US 9,361,236 B2
(45) Date of Patent: Jun. 7, 2016

(54) HANDLING WRITE REQUESTS FOR A DATA ARRAY

(71) Applicant: ARM Limited, Cambridge (GB)

(72) Inventors: Andrew David Tune, Sheffield (GB); Sean James Salisbury, Sheffield (GB)

(73) Assignee: ARM Limited, Cambridge (GB)

( * ) Notice: Subject to any disclaimer, the term of this patent is extended or adjusted under 35 U.S.C. 154(b) by 543 days.

(21) Appl. No.: 13/920,685

(22) Filed: Jun. 18, 2013

(65) Prior Publication Data

US 2014/0372696 A1     Dec. 18, 2014

(51) Int. Cl.
*G06F 12/08*     (2006.01)

(52) U.S. Cl.
CPC ........ *G06F 12/0864* (2013.01); *G06F 12/0846* (2013.01)

(58) Field of Classification Search
CPC .......................... G06F 12/0864; G06F 12/0846
See application file for complete search history.

(56) References Cited

U.S. PATENT DOCUMENTS

| | | | |
|---|---|---|---|
| 5,410,668 A | 4/1995 | Hilton | |
| 5,802,586 A | 9/1998 | Jones et al. | |
| 6,681,294 B1 | 1/2004 | Kato et al. | |
| 2002/0133664 A1 | 9/2002 | Endo | |
| 2003/0126368 A1 | 7/2003 | David | |
| 2005/0141312 A1 | 6/2005 | Sinclair et al. | |
| 2005/0188154 A1 | 8/2005 | Schubert | |
| 2007/0233963 A1 | 10/2007 | Yasufuku | |
| 2008/0276046 A1 | 11/2008 | Moerman et al. | |

OTHER PUBLICATIONS

Rivers, J.A. et al., << On High-Bandwidth Data Cache Design for Multi-Issue Processors >>, IEEE Proceedings of Micro-30, (Dec. 1-3, 1997), 11 pages.

*Primary Examiner* — Kevin Verbrugge
*Assistant Examiner* — Rocio Del Mar Perez-Velez
(74) *Attorney, Agent, or Firm* — Nixon & Vanderhye P.C.

(57) ABSTRACT

A data array has multiple ways, each way having entries for storing data values. In response to a write request, an updated data value having a target address may be stored in any of a corresponding set of entries comprising an entry selected from each way based on the target address. An update queue stores update information representing pending write requests. Update information is selected from the update queue for a group of pending write requests corresponding to different ways, and these write requests are performed in parallel so that updated values are written to entries of different ways.

24 Claims, 10 Drawing Sheets

HANDLING WRITE REQUESTS FOR A DATA ARRAY

FIELD OF THE INVENTION

The present invention relates to the field of data processing. More particularly, the invention relates to the handling of write requests for a data array.

BACKGROUND TO THE INVENTION

A data processing apparatus may have a data array for storing data, such as a cache or buffer. It is common for data to be divided logically into "ways" and for data to be allocated to entries of the data array using an allocation scheme in which a data value with a particular address can only be allocated to a limited set of entries selected based on the address of the data value, the set comprising one entry from each way. For example, a set-associative cache allocates data to the cache in this way. Typically a tag value associated with each entry identifies which data value has been stored in the corresponding entry. When a data value needs to be updated in the data array, then the tag values of the corresponding set of entries are read to determine which entry stores the data value to be updated, and then a write request is issued to write the updated value to the appropriate entry of the data array.

In some applications, the data array may need to be accessed reasonably frequently and so providing sufficient access bandwidth can be a challenge. One way to provide more bandwidth is to divide up the entries of the data array into banks which may be accessed independently and simultaneously. This allows accesses to entries in different banks to be made in parallel, increasing the number of accesses that can be performed in a given time. However, banking comes at a cost of requiring more physical memories and associated wiring. More physical memories are undesirable because they increase circuit area and consume more power, due to the additional sense amplifiers and wiring required for the additional memories. Also the physical layout of a greater number of memories is more difficult to implement, and wiring congestion at the interfaces for each memory becomes a challenge.

Therefore, the present technique seeks to provide a more area and energy efficient technique for increasing access bandwidth for a data array.

SUMMARY OF THE INVENTION

Viewed from one aspect, the present invention provides a data array for storing data comprising:

a plurality of ways each comprising a plurality of entries for storing data values, wherein said data values are identified by addresses;

access control circuitry configured, in response to a write request identifying an updated data value to be stored in the data array and a target address identifying the updated data value, to store the updated data value in one of a corresponding set of entries comprising entries selected from each of said plurality of ways based on said target address;

an update queue configured to store update information representing a plurality of pending write requests; and selection circuitry configured to select update information from said update queue for a group of at least two pending write requests for storing updated data values in entries of different ways;

wherein in response to said update information selected by said selection circuitry, said access control circuitry is configured to perform said group of at least two pending write requests in parallel to store said updated data values in said entries of said different ways.

In a conventional data array having a set-associative allocation scheme (or similar allocation scheme in which a data value can reside only in one of a limited set of locations), updates to data values in the data array are typically processed in two parts. First, a read request is issued to read all the entries within the set corresponding to the target address to determine which entry actually stores the required data, and subsequently a write request is issued to update the determined entry with the updated data value. While the read request is able to access all the entries of the set in parallel, the write request only accesses one entry and the other entries of the set (in different ways) are left alone, and so there is an unused write bandwidth.

The present technique recognises that write requests to different ways may be handled in parallel to make use of this unused write bandwidth. An update queue is provided to store update information representing a plurality of pending write requests. This allows write requests to be gathered together until there are pending write requests that target different ways of the data array, which can be selected as a group to be processed in parallel. In this context, "parallel" means that the processing of each of the group of write requests overlaps in some way. For example, the write requests may all be performed in the same processing cycle. Alternatively, some of the write requests may take two or more processing cycles to complete and for at least one of those processing cycles there may be two or more write requests being processed simultaneously.

Compared to a banked data array, the present technique reduces the amount of wiring and circuit area required to provide a given amount of access bandwidth. While a banked data array achieves parallelism by providing interface circuitry and sense amplifiers for reading all the entries in at least two different sets simultaneously and then writing data values in parallel to one entry from each set, the present technique is able to achieve parallelism even if only one set can be read per cycle, by queuing write requests corresponding to different reads (which may correspond to the same set or to different sets) until there are sufficient write requests targeting different ways that can be handled in parallel. Since a data array typically already has wiring for reading multiple ways in parallel, it is reasonably efficient from a wiring point of view to allow writes to multiple ways to be performed in parallel.

The update information for a pending write request may include a way identifier which identifies which way includes the entry to which the updated data value is to be stored. The selection circuitry can select update information for a group of pending write requests for which each of the requests has a different way identifier, and provide the selected update information to the access control circuitry which then performs the corresponding group of pending write requests in parallel.

The way identifier for each pending write request in the update queue may be determined in response to a read request for the same target address as the write request. For each write request there may be a corresponding read request which reads the entries within the set corresponding to the target address so that it can be determined which of the ways in that set stores the required data. The way determined in response to the read request is stored to the update queue for the corresponding write request. If the data array does not already store a data value corresponding to the target address then one of the entries of the corresponding set can be allocated to that data value and any data already stored in that entry can be evicted to make way for the new data value. Following such a reallocation, the way identifier of the newly allocated entry can be written to the update queue for the corresponding write request.

Alternatively, a way prediction scheme may be used to determine the way identifier for a given write request, so that a read of the all the entries of the corresponding set is not required unless the prediction is incorrect.

The corresponding set of entries may be selected based on an index value derived from a target address of the write request. For example, the index value may be a portion of the target address or may be obtained by applying a hash function to a portion of the target address. Hence, for each set of entries, there is a corresponding group of addresses sharing the same index value which map to that set, so that data from any of these addresses can be stored in that set. The update information in the update queue for a given write request may include the index value of that write request, so that the access control circuitry when performing a given write request can determine which set (and hence which entry) should store the updated data value.

The update information for a pending write request may also include the updated data value itself, which is to be written to the data array when the write request is selected for processing by the selection circuitry.

The update information for a pending write request may also include validity information indicating whether the pending write request is valid. When a pending write request is initially added to the update queue then it may be set as valid. When a pending write request is processed so that the corresponding data value is updated in the data array, then the access control circuitry may set the validity information in the update queue to indicate that the processed write request is invalid, to allow space in the update queue to be reallocated to another pending write request.

While the update queue provides a performance improvement by enabling several write requests to be processed in parallel, queuing up write requests to achieve this parallelism may require some write requests to be delayed for a time. While a write request is queued, a subsequent read or write request may be received for the same target address, in which case a data hazard may occur. If the subsequent request is processed before the conflicting write request in the update queue, then a wrong processing result may occur. To prevent this, the data array may comprise hazard detection circuitry which detects such data hazards. If a data hazard is detected, then the hazard detection circuitry may take action to correct this. There are several options available. For example, processing of the subsequent read or write request may be delayed until the conflicting write request in the update queue has been processed. Also, an earlier write request in the update queue may be merged with a later write request to the same address so that the merged write in the update queue has the same effect on the data array as would have occurred had the two write requests been processed one after the other (for example, the updated data value for the earlier request could be replaced in the update queue with the updated data value for the later request). Read-after-write hazards (a hazard detected between an earlier write request and a later read request) can also be addressed by forwarding a value in the update queue for the pending write request (e.g. the way identifier or the updated data value) as the result of the subsequent read request, so that it is not necessary to actually carry out the later read request. Hence, there are several actions which may be taken in response to a data hazard to ensure correct processing results.

While performance will be improved if pending write requests for different ways of the data array can be grouped together to be performed in parallel, this may not always be possible. For example, sometimes the update queue may not include multiple pending write requests corresponding to different ways (either all the write requests in the update request correspond to the same way, or there may only be one pending write request). In this case, a single pending write request may be processed, and it is not necessary to always wait for a group of requests. To reduce the likelihood of data hazards it may be preferable to process the write request sooner rather than wait for other write requests which could be processed in parallel.

Pending write requests from the update queue will compete with pending read requests for servicing by the access circuitry. A read-write arbiter may be provided to perform read-write arbitration for selecting whether, in a given processing cycle, the access control circuitry should process a pending read request or should process at least one write request (preferably a group of write requests in parallel). To increase the likelihood of write requests being able to be processed in parallel, it is useful for the read-write arbitration to have a write selection probability which increases as the number of pending write requests having update information in the update queue increases. This means that when the number of write requests in the update queue is low, then the read requests are favoured so that it is more likely that write requests will continue to gather in the update queue until there are enough to perform several write requests in parallel. As the update queue fills, the write requests are more likely to be able to be processed in parallel, and so the arbiter gives the write requests an increasing chance of winning the arbitration. This reduces the likelihood that the update queue becomes full and stalls new write accesses, and also avoids write requests being starved in favour of read requests.

The data array may be any type of data store for storing data in which the address of a data value determines a limited set of entries of the data array in which that data value can be stored. For example, the data array may be a data portion of a set-associative cache, and the data values may be data values generated by a processor or other processing device in a processing apparatus. In another example, the data array may be a content addressable memory which is searched based on the data values stored in the memory rather than using tag values identifying a portion of the corresponding address.

Also, the data values may be a portion of an address. Hence, the addresses are both the actual data values stored in the data array and the identifier of the data values. For example, the data array may be a tag memory which stores tag values which are portions of addresses of data values which are stored in a separate data array. For example, the other data array may be a data portion of a cache memory and the tag memory may be used to identify the locations at which data values are stored in the data portion. In another example, the tag memory may be within a data processing apparatus having multiple caches, and the data values associated with the tag values in the tag memory may be located in any of the multiple caches. In this case, the data array (tag memory) may function as a snoop directory or snoop filter which tracks the location of data within the multiple caches so that coherency between the data stored in the caches can be maintained using a cache coherency policy. In the case of a tag memory, the read requests may be for determining the entry storing the corresponding tag value (the tag values read from the tag memory in response to a read request do not need to be output from the data array and are often not of interest to any processing device using the data array).

In general, the greater the number of ways that can be written to in parallel, the greater the access bandwidth and hence the greater the performance improvement. Some data arrays have a large number of ways (e.g. 8 or 16), and one would expect that continuing to increase the number of ways that can be written to in parallel provides additional performance improvements. However, in practice this comes with diminishing returns in bandwidth gain because, while it is reasonably likely that there will be a small number of simultaneous write requests all targeting different ways, a larger group of pending requests all targeting different ways is less common. To reduce the wiring cost of implementing parallel way writes, the data array may be arranged so that the access control circuitry can write to a maximum of M different ways in parallel, where M is an integer less than N, the total number of ways. The value of M can be chosen based on implementation according to how often it is expected that there will be M different write requests targeting different ways.

A hash function may be used to determine which set of entries corresponds to a given data value. For example, the hash function may comprise a direct function which maps a portion of the target address directly to an identifier of a corresponding set of entries. Alternatively, the hash function may modify the index portion in some way to arrive at the set identifier, for example using an exclusive or (XOR) operation with an arbitrary constant. It can be useful to provide different hash functions for at least two different ways of the plurality of ways. It is fairly common for a number of successive write requests to target data associated with addresses within a given range, in which case these requests could be competing for locations in the same set. If there are more competing write requests than there are ways, then this can lead to a live lock situation in which data frequently has to be evicted from the cache to make way for new data. Providing different hash functions for different ways has the effect of increasing the associativity of the data array (effectively increasing the number of locations per set) because the different hash functions mean that addresses which correspond to the same entry within one of the ways will correspond to different entries within another array. Hence, when data is evicted from the cache due to a collision between requests corresponding to the same set for that way, when that data later returns to the cache it may be placed in a different way and so will now collide with a different set of addresses, which may not be requiring so many entries at that point in time, reducing the number of collisions and the likelihood of a live lock condition occurring.

The present technique of writing values in parallel to different ways is particularly useful if different hash functions are used for different ways, which requires some additional wiring in the data array for providing different set index values to the data array corresponding to the results of the different hash functions. Some of this wiring can be reused for supplying the indexes of the locations to be written to in parallel based on the update information from the update queue, to make implementation more efficient.

When a required data value is not in the data array, then it may be allocated to any of the entries of the corresponding set. Various allocation policies may be used to determine which particular entry of the set should be used to store the data value. The present technique is particularly useful in systems which use an allocation policy with a substantially equal probability of a data value being allocated to each of the entries in the set. Such allocation policies will result in a relatively even distribution of data values between different ways of the data array, and so it is more likely that there will be several pending write requests targeting entries in different ways, increasing the likelihood that such write requests can be grouped together to be performed in parallel to improve bandwidth. For example, the allocation policy may be a random allocation policy in which data values are allocated to any entry of the corresponding set chosen at random, a pseudo random allocation policy in which the allocation is not truly random, a least recently used allocation policy in which the data value is added to the entry within a set which has been accessed least recently, or a pseudo least recently used allocation policy in which an estimate of the least recently used entry of the set is made, but the estimate cannot accurately determine the least recently used entry. Other allocation policies may also be used.

While the present technique is more energy efficient than banked data arrays for providing the same level of bandwidth, it is also possible to combine these techniques so that write requests are handled in parallel in a banked data array. For example, the data array may have a first bank and a second bank (or more banks) which can be accessed completely independently from one another (both reads and writes). For each bank, an update queue buffers write requests targeting that bank. A group of write requests targeting different ways can be selected from each update queue and processed in each bank in parallel. Hence, the present technique can provide a further performance improvement to data arrays which are already arranged in banks.

Viewed from another aspect, the present invention provides a data array for storing data comprising:

a plurality of ways each comprising a plurality of entries for storing data values, wherein said data values are identified by addresses;

access control means for controlling storage of data values in said entries, wherein in response to a write request identifying an updated data value to be stored in the data array and a target address identifying the updated data value, said access control means is configured to store the updated data value in one of a corresponding set of entries comprising entries selected from each of said plurality of ways based on said target address;

update queue means for storing update information representing a plurality of pending write requests; and selecting means for selecting update information from said update queue for a group of at least two pending write requests for storing updated data values in entries of different ways;

wherein in response to said update information selected by said selecting means, said access control means is configured to perform said group of at least two pending write requests in parallel to store said updated data values in said entries of said different ways.

Viewed from a further aspect, the present invention provides a method of storing data in a data array comprising a plurality of ways each comprising a plurality of entries for storing data values, wherein said data values are identified by addresses; the method comprising:

storing in an update queue update information representing a plurality of pending write requests, each pending write request identifying an updated data value to be stored in the data array and a target address identifying the updated data value, wherein the updated data value is storable in any of a corresponding set of entries comprising entries selected from each of said plurality of ways based on said target address;

selecting update information from said update queue for a group of at least two pending write requests for storing updated data values in entries of different ways; and in response to the selected update information, performing said group of at least two pending write requests in parallel to store said updated data values in said entries of different ways.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
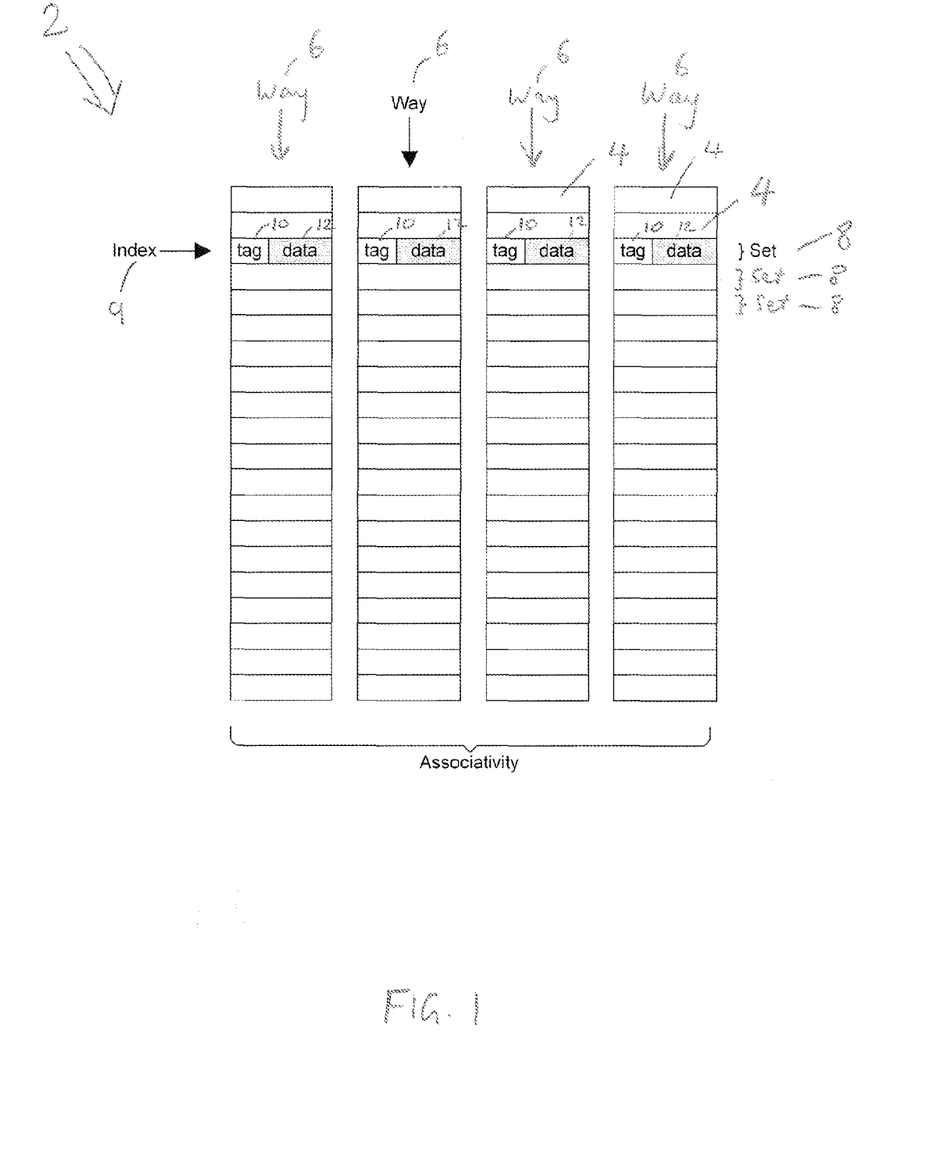
FIG. 1 schematically illustrates a logical arrangement of entries in a data array.

FIG. 1 shows the logical arrangement of a conventional data array 2 comprising a number of entries 4 for storing data values. The entries 4 are arranged logically into ways 6 and sets 8, each set 8 including an entry 4 from each of the ways 6. The number of ways 6 (or the number of locations in each set) is known as the "associativity" of the data array. It will be appreciated that FIG. 1 merely shows the logical arrangement of the entries 4, representing the way in which the entries are accessed. The physical arrangement of the entries 4 may be different. For example, "neighbouring" entries of the same set 8 or the same way 4 may in practice be arranged at separate physical locations in a memory device.

Each data value to be stored to the data array 2 has a corresponding address which is formed of an index portion 9 and a tag portion 10. The data value can be stored in any of the entries 4 of a corresponding set 8 determined based on the index portion 9 of the address of the data value, and cannot be stored in entries of other sets. Since the data value can be stored in several possible locations of the set, the tag portion 10 of the address is stored to the selected entry 4 along with the data value 12 so that subsequent accesses can determine which entry stores the data value 12. Each entry 4 may also store state information associated with data values 12 such as a valid bit indicating whether data stored in the data array 2 is valid or a dirty bit indicating whether the data value 12 is the same as the corresponding data value 12 stored in memory.

FIG. 1 shows the tag value 10 and the corresponding data value 12 being stored in the same entry 4 of the data array 2. In some data arrays, a single memory device stores both the tag values 10 and the data values 12. In other examples, a separate data memory and tag memory may be provided for storing the data values 12 and tag values 10 respectively (e.g. see FIG. 11).

Also, for some data arrays 2, the tag value 10 may itself be the data value of interest, and so there may not be a separate data value 12. For example, tag-only data arrays may be useful for tracking the locations of data values stored in a number of different locations within a data apparatus (such as multiple caches or buffers within the processing system). Therefore, it is not essential for the data array 2 to store the data value 12 itself—the tag 10 itself may be considered to be the "data value" stored by the data array.

Typically, most accesses to the data array 2 require both a read and a write access to the tags 10. For example, when a tag value 10 (or data value 12) identified by a target address needs to be updated, then first a read request is issued to read the tags 10 in all of the locations 4 of the corresponding set 8 identified based on the index portion of the target address. The read tags are compared with the tag portion of the target address, and if there is a tag match then the entry 4 having the matching tag is selected. A subsequent write request would then write an updated value to the selected entry 4 determined in response to the read request. If in response to the read it is determined that none of the entries 4 of the corresponding set 8 has a matching tag, then a new entry can be allocated within the corresponding set 8 (and any data already stored in that entry can be evicted), and then the subsequent write request can write the updated tag value 10 (or data value 12) to the allocated entry 8. Hence, in a typical cache it is possible to read data from all the ways 6 of the same set 8 at once, or to write data to a single entry, but it is not possible to perform multiple writes in parallel. Sometimes, this may not be sufficient to satisfy access bandwidth requirements. For example, some data arrays (e.g. snoop directories or high level caches) may be accessed frequently and so providing sufficient bandwidth can be a challenge.

Figure 2A:
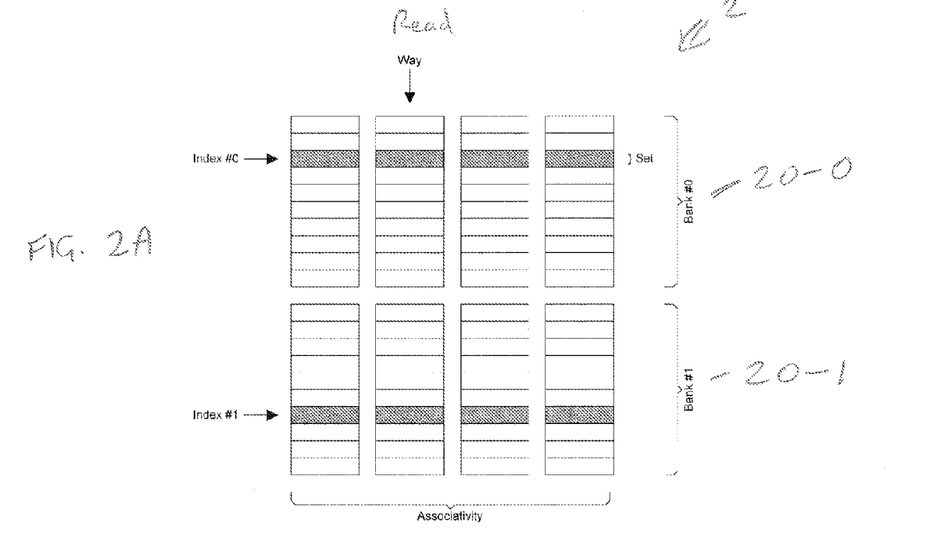
FIGS. 2A and 2B illustrate read and write operations in a conventional banked data array.
Figure 2B:
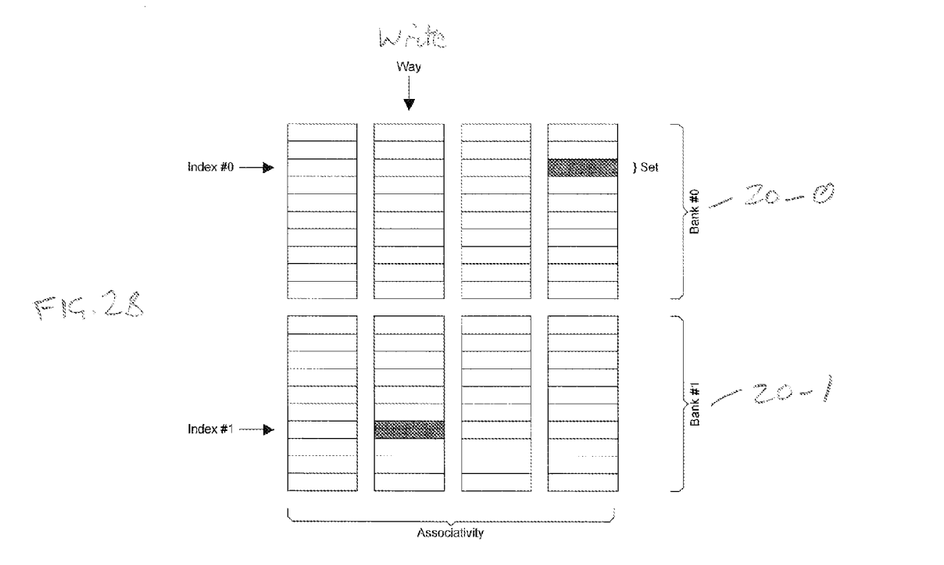

As shown in FIGS. 2A and 2B a known way to provide more bandwidth is to divide the array 2 into separate banks 20-0, 20-1 which can be independently accessed in parallel with one another. As shown in FIG. 2A, parallel read operations can be performed simultaneously, one to a first bank 20-0 and one to a second bank 20-1. As shown in FIG. 2B, parallel write operations can also be performed, each writing to a single location in different banks 20-0, 20-1. However, providing independent banks 20 requires more physical memories and more wiring for supporting the parallel operations. For example, a greater number of sense amplifiers and tag comparators may be required to compare the tag values 10 from all the entries read from each bank 20-0, 20-1 as shown in FIG. 2A. This requires greater circuit area and consumes more power, which is undesirable.

Figure 3:
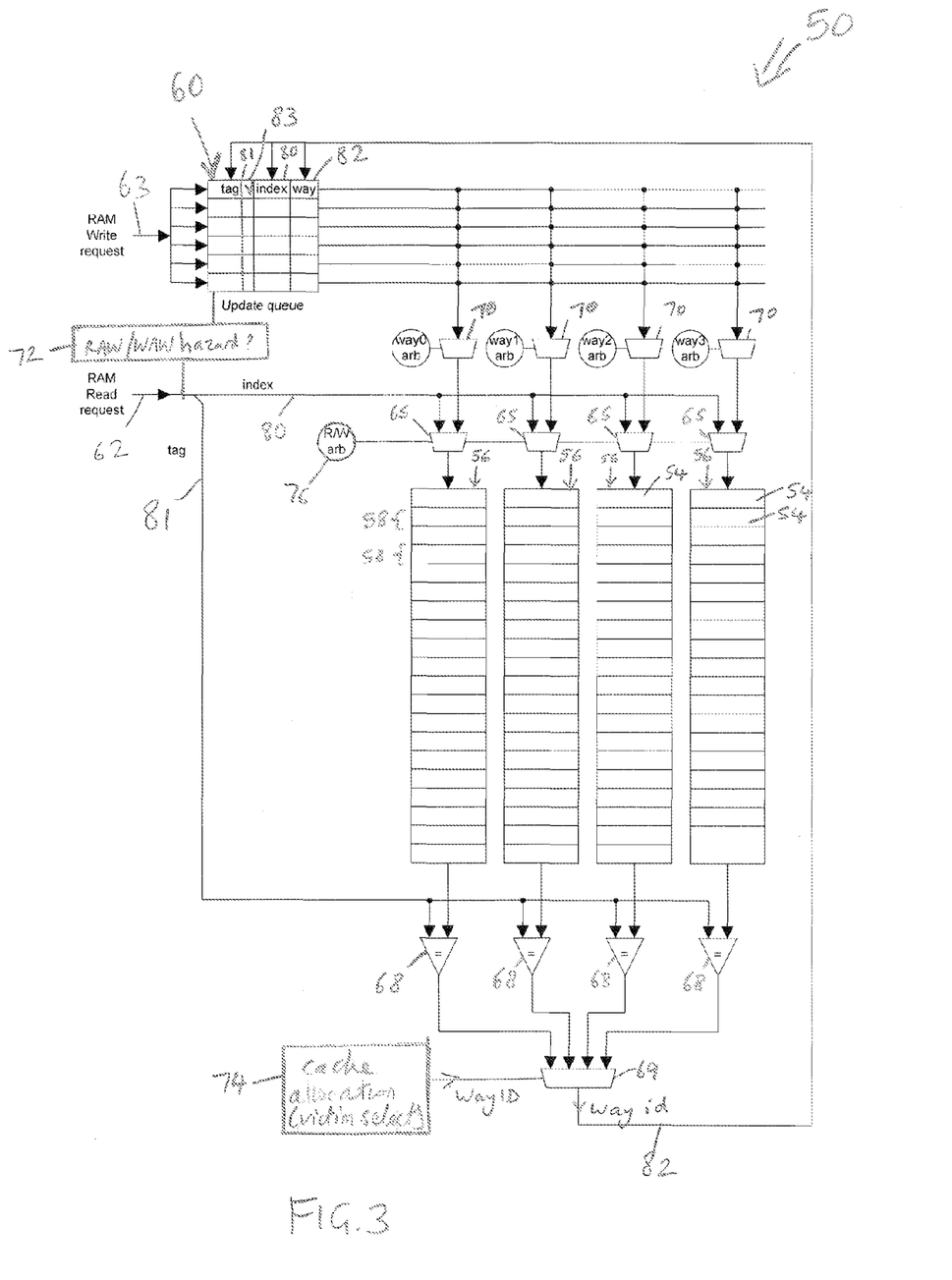
FIG. 3 schematically illustrates a data array having an update queue for storing update information for pending write requests and selection circuitry for selecting groups of write requests from the update queue for processing in parallel by the data array.

FIG. 3 shows a data array 50 according to the present technique. The data array 50 allows multiple write requests to be performed in parallel without the additional overhead of providing independent banks of entries. The data array 50 comprises a plurality of entries 54 which are divided logically into ways 56 and sets 58 in a similar way to FIG. 1. The array 50 also comprises an update queue 60 for storing update information for pending write requests, access control circuitry 65, tag comparators 68, selection circuitry 70, hazard detection circuitry 72, cache allocation circuitry 74 and read/write arbitration circuitry 76.

Figure 4A:
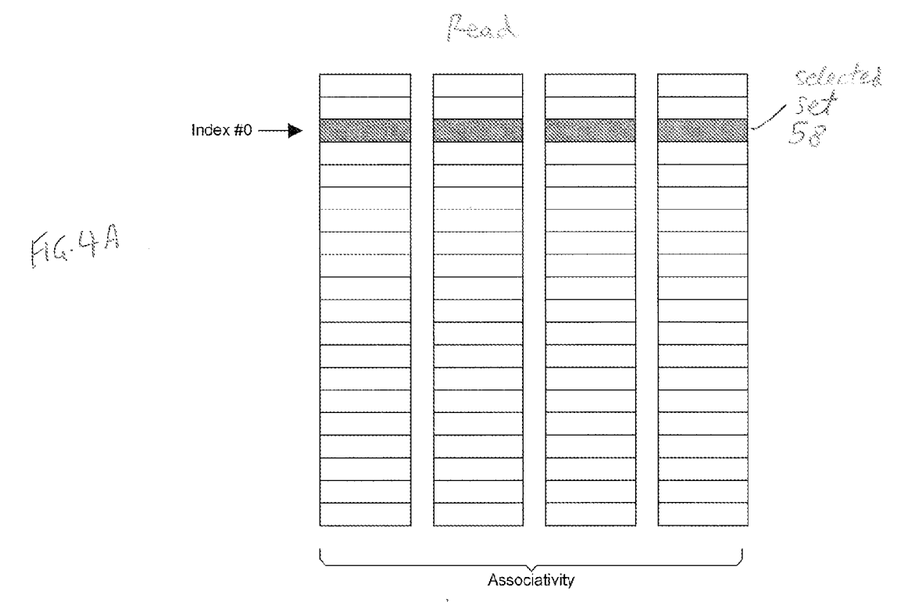
FIGS. 4A and 4B illustrate read and write operations for the data array of FIG. 3.
Figure 5:
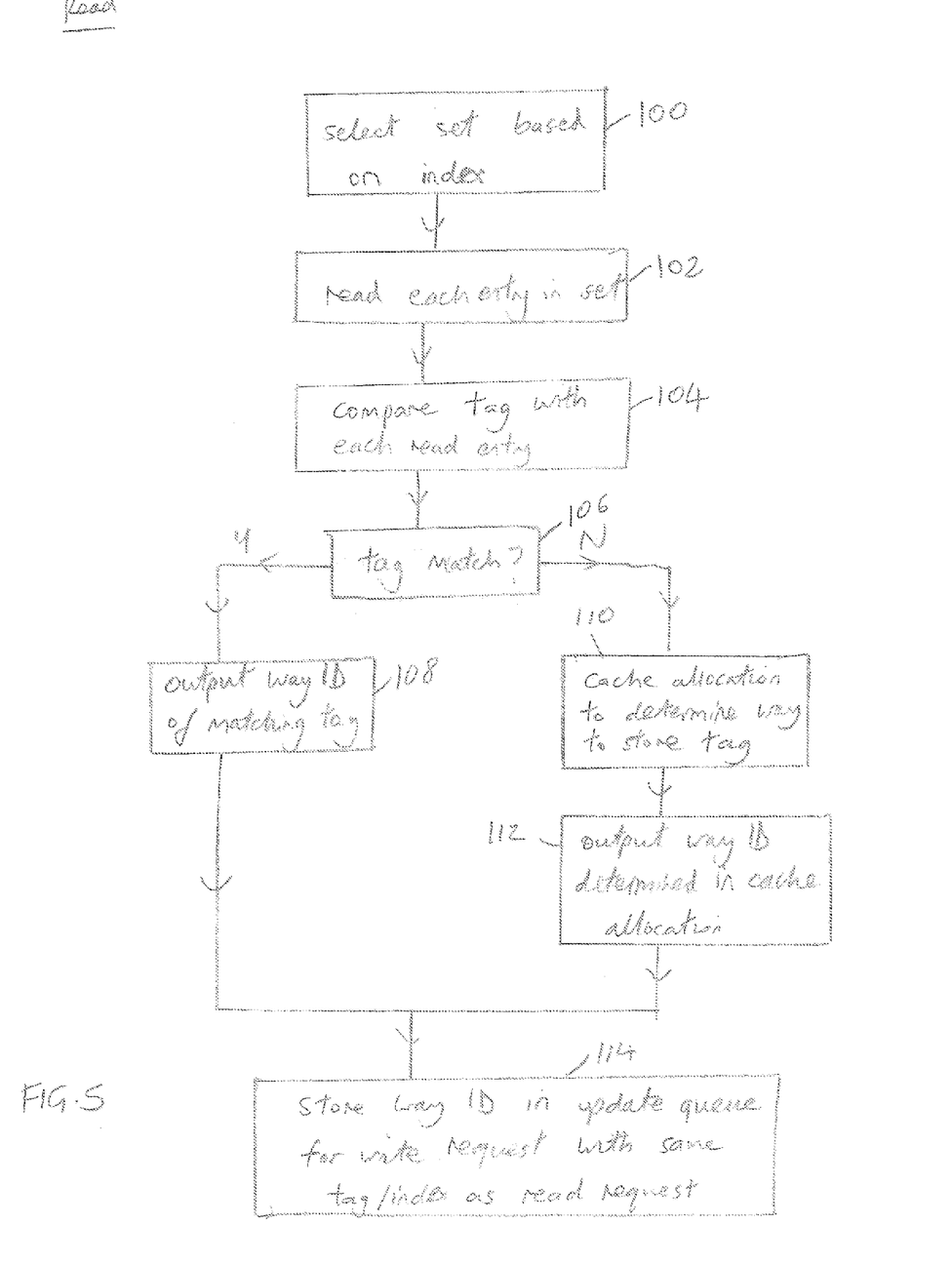
FIG. 5 illustrates a method of processing a read request for determining whether the data array stores a data value corresponding to a target address.

In this example, the data array 50 is a tag memory for storing tag values. To update a tag value to the data array 50, a read request 62 and a write request 63 specifying the same target address are issued to the data array 50. FIG. 4A schematically illustrates an example of the entries accessed in response to an read request, and FIG. 5 shows a method of processing a read request 62 specifying a target address. At step 100 of FIG. 5, a set 58 is selected based by applying a hash function to the index portion 80 of the target address (see index #0 in the example of FIG. 4A). At step 102, the tag values are read from each entry of the selected set 58. At step 104, the tags read from each of the entries 54 of the corresponding set 58 are output to tag comparators 68 where they are compared with the tag portion 81 of the target address. Each tag comparator 68 corresponds to one of the ways 56 of the array 50 and outputs a signal indicating whether the tag portion of the target address matches the tag read from that way of the corresponding set. At step 106, the multiplexer 69 determines whether there has been a tag match, and if so, which of the ways 56 stores the matching tag value. If there was a tag match, then at step 108 the multiplexer 69 outputs a way identifier 82 indicating the way which stored the matching tag. If none of the tag comparators 68 detects a matching tag, then at step 110 the cache allocation circuitry 74 selects a victim way for storing the tag value, and at step 112 controls the multiplexer 69 to output the way identifier 82 indicating the victim way. The victim way can be selected using any cache allocation policy such as random, pseudo random, least recently used (LRU) or pseudo least recently used (pLRU) for example.

At step 114, the way identifier 82 determined by the multiplexer 69 or the cache allocation circuitry 74 is output to the update queue 60, where it is stored as update information for the corresponding write request 63 having the same target address as the read request 62. The update information for the write request 63 also includes the tag and index portions 80, 81 of the target address of the write request, and a valid bit 83 indicating whether the write request is valid. The tag value 81 represents the data value to be written to the data array 50.

Figure 4B:
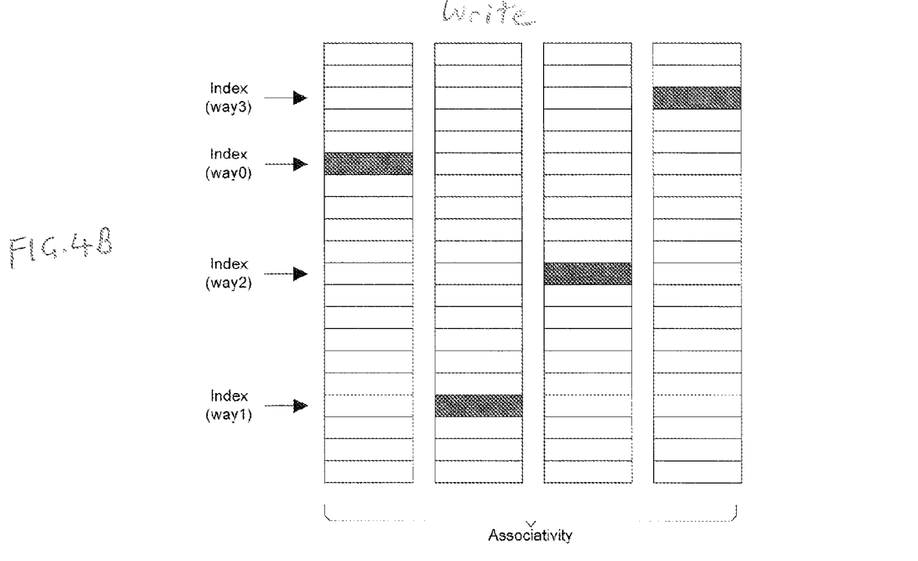
Figure 6:
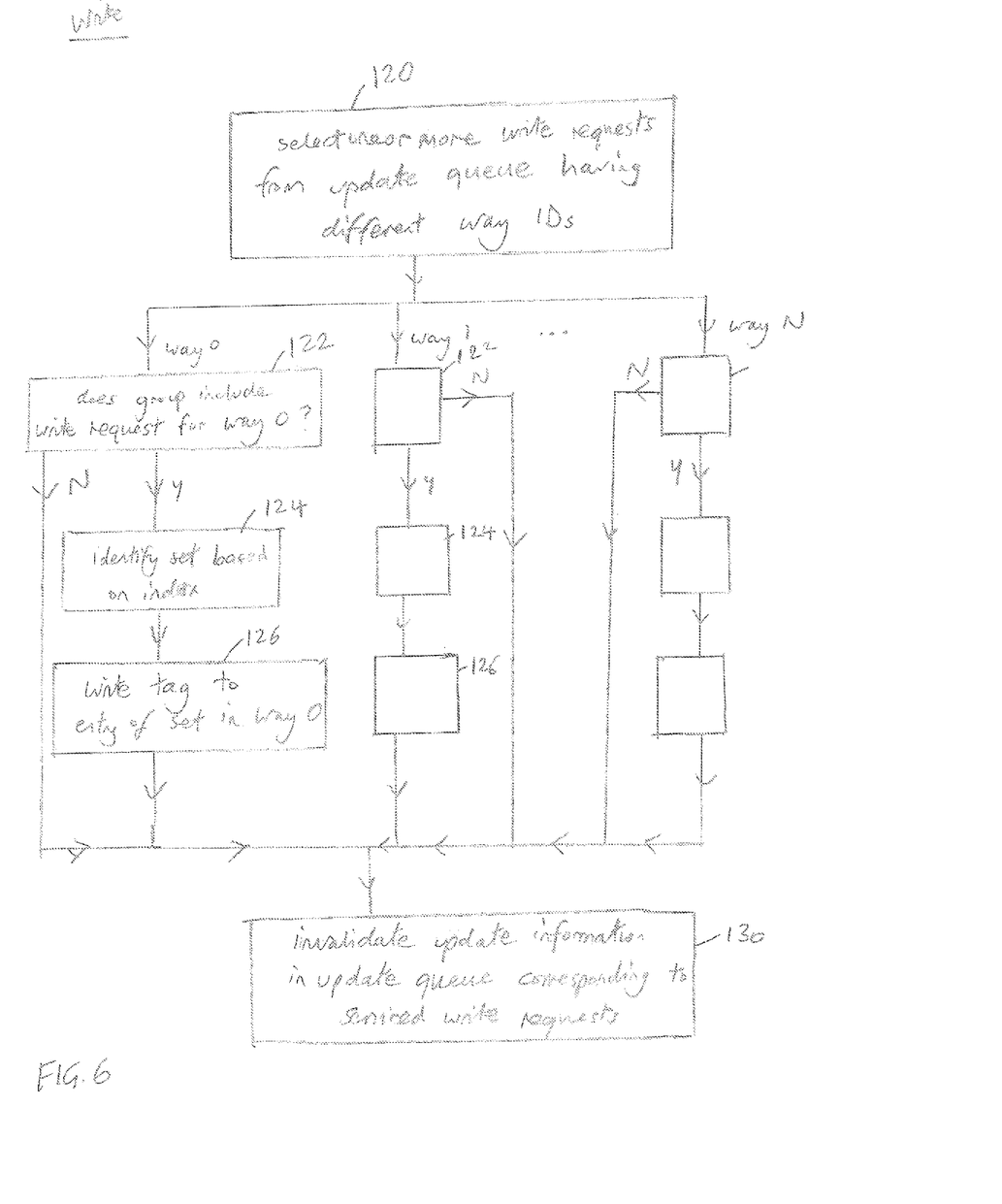
FIG. 6 illustrates a method of processing one or more write requests in parallel.

The update queue 60 buffers pending write requests until they are processed by cache access control circuitry 65. FIG. 6 illustrates a method of processing write requests from the update queue 60, while FIG. 4B schematically illustrates an example of entries accessed in response to a group of write requests from the update queue. At step 120 of FIG. 6, selection circuitry 70 selects update information from the update queue 60 corresponding to a group of pending write requests having different way identifiers 82. The selection circuitry 70 comprises multiplexers corresponding to each way which each select one write request targeting a location in the corresponding way 56 as indicated by the way identifier 82. If there are several requests targeting the same way in the update queue 60 then the multiplexer 70 can select the oldest of these requests or use another arbitration scheme to determine which request to process.

The update information for each of the selected group of requests is output to the access control circuitry 65 which then controls the data array 50 to perform the different pending write requests in parallel to the different ways 56. At step 122, the access control circuitry 65 corresponding to way 0 determines whether the group selected by the selection circuitry 70 includes a write request having a way identifier of 0. If so, then at step 124 the corresponding set for that write request is identified from the index portion 80 of the update information. At step 126, the entry within the selected set is identified from the way identifier 82 and the tag value 81 is written to that entry. Steps 122 to 126 are performed in parallel for each way of the data array 50. As shown in FIG. 4B, data can be written in parallel to entries in different ways 56, which can be in different sets identified by different index values.

Once all the write requests have been carried out, then at step 130 the update information of the serviced write requests is invalidated in the update queue 30 so that they are not performed again. The valid bit 83 for the serviced write requests may be set to an invalid state to indicate that this update information can be overwritten with information for new write requests.

As shown in FIG. 4B, by queuing up write requests in the update queue 60 rather than processing all the write requests one by one as they come in, enough write requests can be gathered together in a group so that they can write to different ways within the same processing cycle, thus making full use of the available write bandwidth and improving processing performance. Writing to different ways in parallel requires less additional circuitry and wiring than the banked implementation shown in FIGS. 2A and 2B. To achieve approximately the same access bandwidth as the banked implementation having two banks, the present technique requires half the number of RAM instances.

For example, if, in a 4-way directory, it is possible on average to write from the update queue to 4 ways in parallel, then every 5 RAM accesses we can perform 4 reads plus up to 4 writes, i.e. an average of 0.8 read+write pairs per cycle. In a conventional organization, it would only be possible to perform 0.5 read+write pairs per cycle. This example demonstrates a 60% bandwidth improvement on the conventional organization. For example, if a conventional tag structure could support tag accesses corresponding to 25 GB/s of data, by writing to 4 ways at once, the present technique could support a bandwidth of up to 40 GB/s without requiring more banks of tag RAM. While there is a probability of less than 1 that it is possible to write more than 1 way on each write access (for example, the update queue 60 may only have one pending write request, or all the pending write requests may target the same way), in the comparable banked implementation there is similarly a probability of less than 1 that it is possible to write to more than 1 bank on each access. By increasing the size of the update queue 60, the probability of parallel write operations to different ways being possible increases. Hence, compared with banked (or partitioned) RAM implementation, the parallel way update scheme gives a reduction in the number of wires needed at the same bandwidth.

Allowing every single RAM way of W ways to be independently written in parallel would require W times as many write data wires and W times as many address wires to the RAMs. Increasing the number of ways that can simultaneously be written has diminishing bandwidth returns, so allowing more than one but less than the total number of ways to be written in parallel may be preferred to provide a better balance between circuit area and energy consumption on one hand and access bandwidth on the other hand. Nevertheless, this still gives less wires per unit of bandwidth than a banked RAM implementation. For example, with 8-way tags but only 2 parallel write paths, we expect up to 33% bandwidth improvement with 12% fewer wires per unit bandwidth than a standard cache arrangement which can only provide one write access per cycle. When compared with banked RAM implementation, the presence of the update queue and parallel way writes gives improved utilization, and the saving in wires per unit bandwidth is likely to approach 25%.

Hazard detection circuitry 72 is provided for detecting read-after-write hazards or write-after-write hazards. These can occur if a subsequent read or write request is received which specifies the same target address as a pending write request in the update queue 60 which has not yet been processed. If a hazard is detected, then the hazard detection circuitry 72 addresses this by delaying the subsequent read or write requests until the earlier write request has been completed, by merging successive write requests to form a merged write request having the same effect as if the original write requests were handled in sequence, or by forwarding the way identifier 82 of the pending write request as a result of the read request (making the read request unnecessary since the way identifier 82 has already been obtained by the multiplexer 69). Hence, hazards can be detected and addressed to ensure correct processing results.

The read requests and write requests compete for access bandwidth. In each cycle, the access control circuitry 65 can handle either a read request 62 or a group of one or more parallel write requests based on update information from the update queue 60. Read/write arbitration circuitry 76 (or "arbiter") is provided to determine whether the access control circuitry 65 should process a read request or a group of write requests in a given processing cycle.

Figure 7:
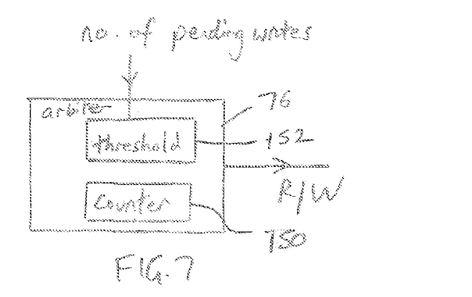
FIG. 7 illustrates an arbiter for determining whether, in a given processing cycle, the data array should process a read request or one or more write requests.

FIG. 7 shows an example implementation of the arbiter 76. A possible way of performing arbitration is to select read requests for servicing until the number of pending write requests in the update queue 60 reaches a given threshold level, at which point a group of write requests is selected. However, a problem with this approach is that some pending write requests may remain in the update queue for a long time (for example, if a single write request is pending, and then no more write requests are issued and so the number of pending write requests does not rise above the threshold level).

Figure 8:
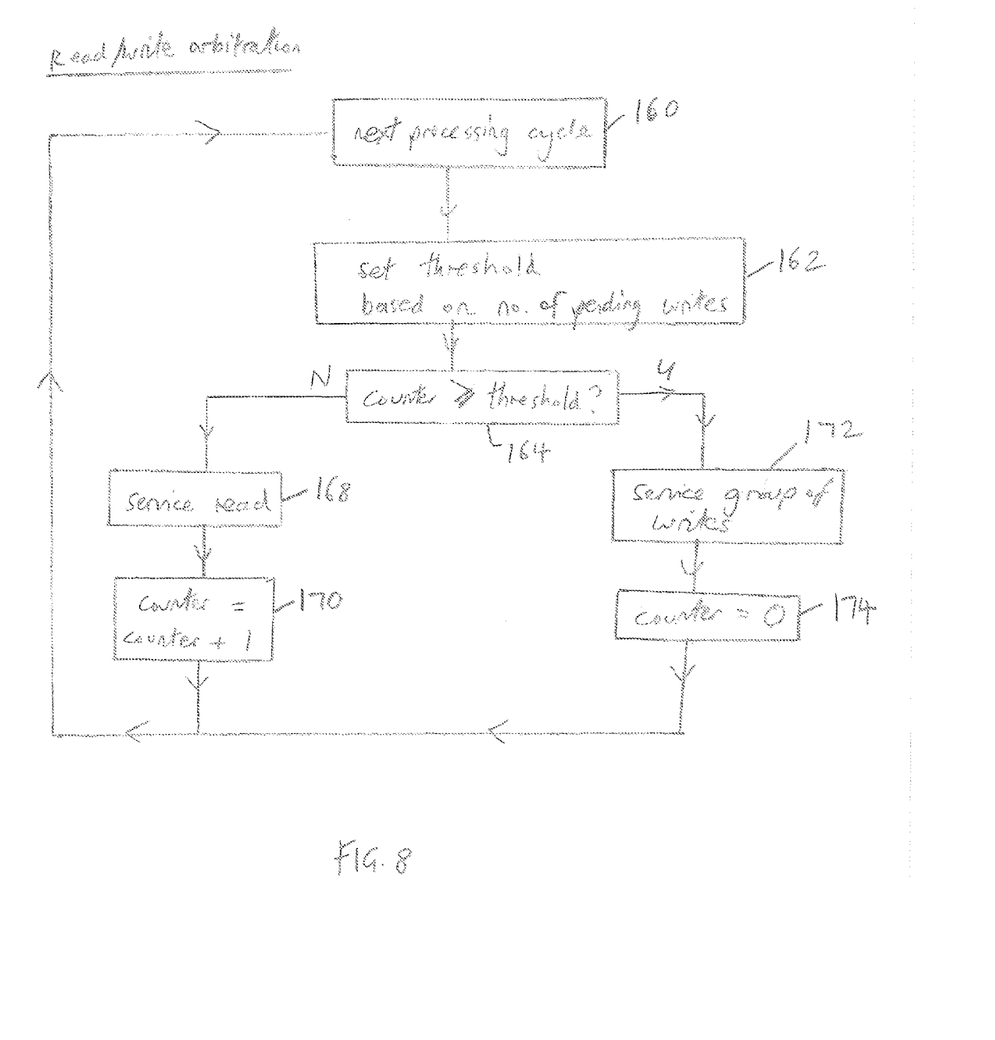
FIG. 8 illustrates a method of read/write arbitration performed by the arbiter.

Therefore, it is preferable to ensure that write requests are given a chance to be serviced even if the number of write requests in the update queue is low. One way of doing this is shown in FIGS. 7 and 8. As shown in FIG. 7, the arbiter 76 has a counter 150 for counting serviced read requests that have been processed by the data array 50 and a threshold value 152 which represents the number of read requests which may be serviced before a write request should be serviced. In each processing cycle, the arbiter 76 determines based on the counter 150 whether the array 50 should service a read request or a group of one or more write requests selected by the selection circuitry 70. The arbiter 76 gives write request an increasing chance of winning the arbitration as the update queue 60 fills up with write requests, to ensure that the update queue 60 neither becomes full nor allows writes to be starved. For example, if the update queue 60 stores a maximum of four pending write requests, then the arbiter 76 may set the threshold 152 as follows so that the frequency with which a write access is performed increases as there are more entries in the update queue 60:

| Number of entries in update queue 60 | Threshold value 152 | How often is write performed? |
|---|---|---|
| 1 | 7 | Every $8^{th}$ access to the data array |
| 2 | 5 | Every $6^{th}$ access to the data array |
| 3 | 3 | Every $4^{th}$ access to the data array |
| 4 | 1 | Every $2^{nd}$ access to the data array |

FIG. 8 shows an example of a method of arbitration. At step 160 the next processing cycle starts. At step 162 the arbiter 76 sets the threshold on 52 based on the number of pending writes in the update queue 60, for example as in the table above. At step 164, the arbiter 76 determines whether the counter 150 is greater than or equal to the threshold 152. If not, then at step 168 the arbiter 76 determines that a read request should be serviced in the current cycle, and at step 170 increments the counter 150. On the other hand, if the counter 150 is equal to or greater than the threshold, then at step 172 the arbiter 76 determines that a group of write requests should be serviced and controls the access control circuitry 65 to write data based on the update information selected by the selection circuitry 70. At step 174, the counter is reset to 0. The method then returns to step 160. Hence, the threshold 152 represents the number of consecutive read requests that can be processed before the next write request should be processed. As the number of entries in the update queue 60 increases, the write requests are given a greater chance of being processed. This increases the likelihood that write requests can be grouped together in parallel for performing in the same cycle. It will be appreciated that this arbitration scheme is merely an example and that other schemes may also be used.

The storage capacity of the update queue 60 can be selected as required. The larger the update queue, the higher the probability that there will be pending write requests for accessing different ways, and so the greater the bandwidth improvement. However, this will also cause pending access requests to remain in the update queue 60 for a longer period of time, increasing the number of hazards which need to be dealt with by the hazard detection circuitry 72. Therefore the size of the other queue should balance these two factors. The ideal size is one which is just big enough to allow sufficient pending access requests to be grouped together by the selection circuitry 70, and no larger. The ideal size will depend on the application for which the data array is used. In practice, some additional margin may be provided above this ideal size.

Figure 9:
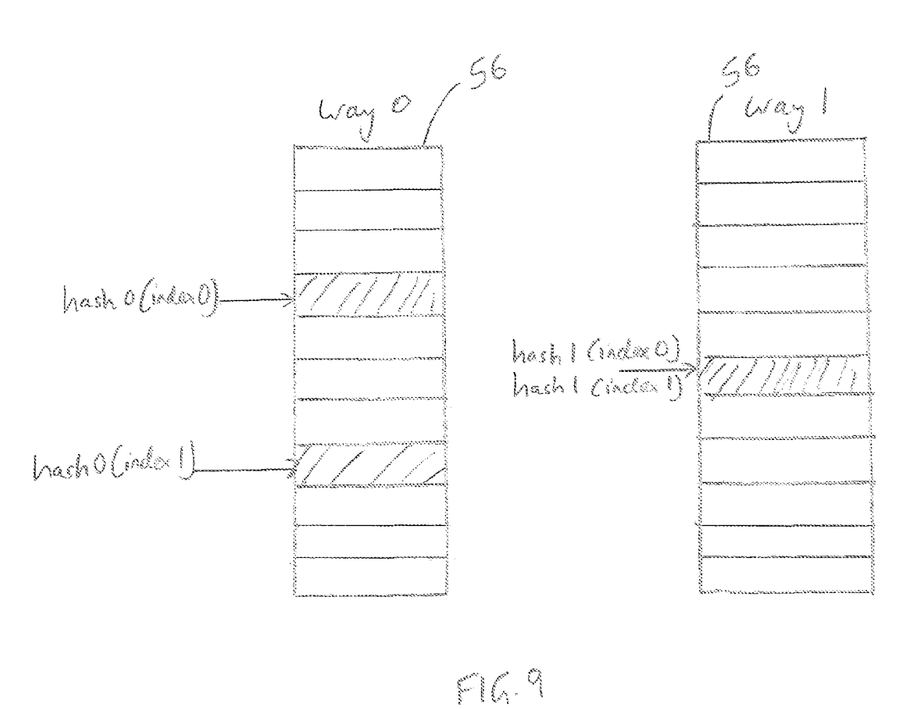
FIG. 9 illustrates an example of using different hash functions for different ways to determine which entry of the way belongs to a set.

FIG. 9 illustrates an example in which the mapping of entries to sets 58 can be performed using hash functions which differ for different ways 56. For example, for each way, the access control circuitry 65 may determine the index of the corresponding set by applying a bitwise exclusive or (XOR) operation to the index portion 80 and a constant, with different constants being used for different ways 56. As shown in FIG. 9, this means that addresses with the same index portion which correspond to different entries in one way (way 0) may correspond to the same entry in another way (way 1). This helps to reduce the risk of collisions between write requests targeting the same entry, and effectively increases the associativity of the data array. For data arrays using different hash functions for the different ways 56, there may already be wiring for supplying the different index values to different ways of the data array 50, and this can efficiently be reused for supplying different indices to the data array for parallel write operations.

Figure 10:
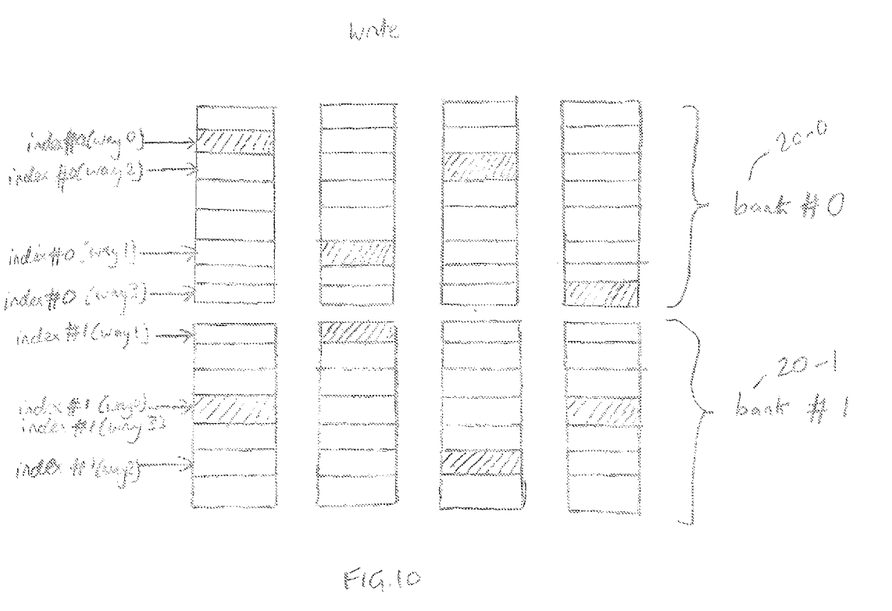
FIG. 10 illustrates an example of a banked data array structure in which, for each bank, parallel way writes are performed in a similar way to FIG. 4B.

FIG. 10 shows an example in which the present technique is combined with the banked data array technique described above with respect FIG. 2. For each bank 20-0, 20-1, a number of parallel write requests can be performed each write request within the same bank targeting different ways. In this way, a further performance improvement can be provided in addition to the improvement provided by banking.

Figure 11:
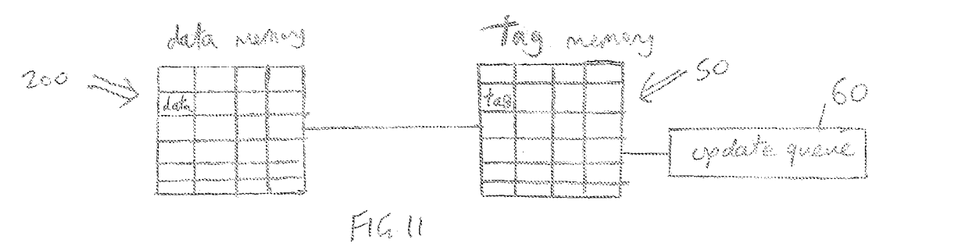
FIG. 11 illustrates an example of a tag memory for storing tag values associated with data values in a data memory.

FIG. 11 shows an example where the data array 50 is a tag memory having an associated data memory 200. The data memory 200 stores data values processed by a processor for example. The tag memory 50 stores tag portions of the addresses of the corresponding data values in the data memory 200. The tag memory 50 in this example may have an associated update queue 60 as shown in FIG. 3 for buffering pending write requests for updating tag values, while the data memory 200 does not require such an update queue 60. In the tag memory 50, resources are already provided for accessing multiple ways in parallel in order to read multiple tag entries of the same set to determine which entry corresponds to the target address, and so it is reasonably efficient to extend this resource so that writes to different ways can also be provided in parallel. In contrast, in the data memory 200 only one data entry would typically be accessed at a time, because once the relevant tag value has been located in the tag memory 50, then this identifies which particular location in the data memory 200 stores the required data value.

Figure 12:
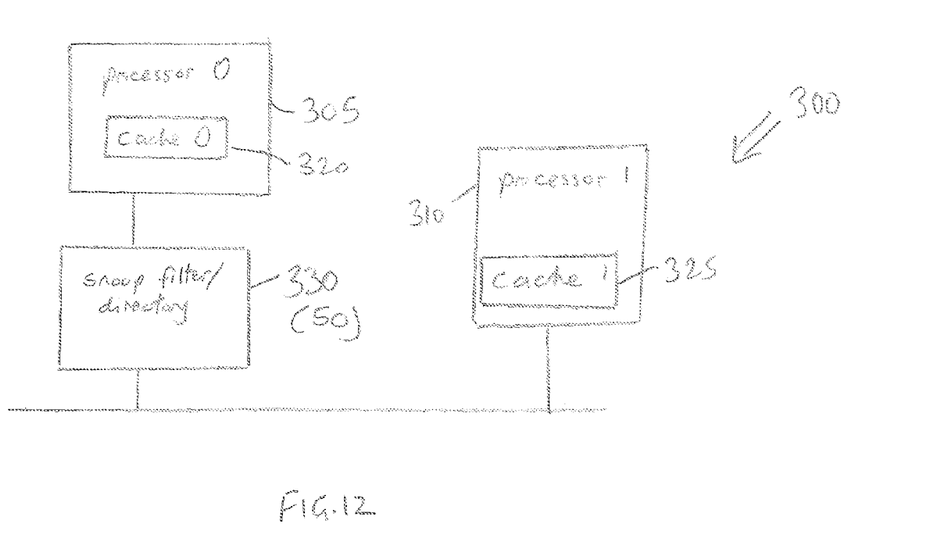
FIG. 12 illustrates a data processing apparatus having multiple caches and a snoop filter/directory for tracking which data is stored in the caches.

FIG. 12 shows another example application of the present technique. FIG. 12 shows a data processing apparatus 300 having processors 305, 310 which each have a corresponding cache 320, 325. Each cache 320, 325 may separately store versions of data values from the same address, and so a snoop filter or snoop directory 330 is provided to track which data is stored in the respective caches 320, 325, so that coherency between these values can be maintained using a coherency scheme. The snoop filter/director 330 may be arranged as in the data store 50 of FIG. 3. The snoop filter/directory 330 may store tag values representing portions of addresses of data values stored in the caches 320, 325. If a snoop filter is provided, then it may track only a subset of the data from the caches 320, 325, while if a snoop directory is provided, then it may store a full record of the cached data.

Providing sufficient access bandwidth is particularly important for a snoop filter/directory 330, as the snoop filter/directory 330 could track data stored in a large number of caches. For example, if there are eight caches in the system then the snoop directory 330 would generally need eight times the tag access bandwidth of each of the caches, because the snoop directory 330 would need to be accessed each time one of the caches is accessed. Also, the snoop directory 330 would be larger and consequently slower than each individual cache 320, 325. Therefore, providing sufficient tag bandwidth in the snoop filter or snoop directory 330 is a challenge and so in this situation it is very useful to be able to perform several writes to the snoop filter/directory 330 in parallel while reducing area and power consumption overheads.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data array for storing data comprising:
   at least one bank, each bank comprising a plurality of ways, each way comprising a plurality of entries for storing data values, wherein said data values are identified by addresses;
   access control circuitry configured, in response to a write request identifying an updated data value to be stored in the data array and a target address identifying the updated data value, to store the updated data value in one of a corresponding set of entries comprising entries selected from each of said plurality of ways based on said target address;
   an update queue configured to store update information representing a plurality of pending write requests; and
   selection circuitry configured to select update information from said update queue for a group of at least two pending write requests for storing updated data values in entries of different ways within the same bank;
   wherein in response to said update information selected by said selection circuitry, said access control circuitry is configured to perform said group of at least two pending write requests in parallel to store said updated data values in said entries of said different ways within the same bank.

2. The data array according to claim 1, wherein said update information for a pending write request comprises a way identifier identifying which of said plurality of ways includes the entry in which said updated data value is to be stored.

3. The data array according to claim 2, wherein said selection circuitry is configured to select said update information for said group of at least two pending write requests such that each pending write request of said group has a different way identifier.

4. The data array according to claim 2, wherein said access control circuitry is configured to determine said way identifier for said pending write request in response to a read request for determining which of said corresponding set of entries stores a data value identified by said target address.

5. The data array according to claim 4, wherein said access control circuitry is configured, in response to said read request, to:
   (i) read data values from the corresponding set of entries selected based on said target address;
   (ii) determine from the read data values which of said plurality of ways is a target way including the entry for storing the data value identified by said target address, and
   (iii) store said way identifier indicating said target way to said update queue for the pending write request identifying said target address.

6. The data array according to claim 1, wherein said access control circuitry is configured to select said corresponding set of entries based on an index value derived from said target address of said write request; and
   said update information for a pending write request comprises said index value.

7. The data array according to claim 1, wherein said update information for a pending write request comprises said updated data value.

8. The data array according to claim 1, wherein said update information for a pending write request comprises validity information indicating whether the pending write request is valid.

9. The data array according to claim 8, wherein in response to a pending write request being processed to store said updated data value to said data array, said access control circuitry is configured to set said validity information in said update queue to indicate that the processed write request is invalid.

10. The data array according to claim 1, comprising hazard detection circuitry configured to detect a data hazard if a subsequent read request or a subsequent write request identifies the same target address as the target address of one of said plurality of pending write requests from said update queue.

11. The data array according to claim 1, wherein said selection circuitry is configured to select update information from said update queue for a single pending write request in a processing cycle when said update queue does not include a plurality of pending write requests for storing updated data values in entries of different ways; and
   in response to said update information for said single pending write request, said access control circuitry is configured to process said single pending write request to store said updated data value to one of said entries.

12. The data array according to claim 1, comprising a read-write arbiter configured to perform read-write arbitration for selecting whether, in a current processing cycle, said access control circuitry should process at least one pending write request based on update information selected by said selection circuitry or should process a pending read request for determining which of said corresponding set of entries stores a data value identified by a target address.

13. The data array according to claim 12, wherein a probability of said read-write arbitration selecting said at least one pending write request for processing by said access control circuitry increases as the number of pending write requests having update information in said update queue increases.

14. The data array according to claim 1, wherein said data array comprises a set-associative cache.

15. The data array according to claim 1, wherein said data values stored in said entries comprise at least a portion of said addresses identifying said data values.

16. The data array according to claim 1, wherein said data array comprises a tag memory and said data values comprise at least a portion of addresses of data stored in another data array.

17. The data array according to claim 1, wherein said data values comprise at least a portion of addresses of data stored in a plurality of caches of a data processing apparatus.

18. The data array according to claim 1, wherein said plurality of ways comprise N ways, where N is an integer; and
said access control circuitry is configured to update data values in entries within a maximum of M different ways in parallel, where M is an integer less than N.

19. The data array according to claim 1, wherein said corresponding set of entries comprises entries selected from each of said plurality of ways based on a hash function applied to said target address.

20. The data array according to claim 19, wherein said hash function is different for at least two different ways of said plurality of ways.

21. The data array according to claim 1, comprising cache allocation circuitry configured to control allocation of data values to said cache according to a cache allocation policy for which each entry of the corresponding set of entries has a substantially equal probability of a data value being allocated to that entry.

22. The data array according to claim 1, wherein said data array comprises a first bank of entries and a second bank of entries;
said access control circuitry is configured to perform a first group of pending write requests in parallel with a second group of pending write requests;
said first group of pending write requests comprising pending write requests which are for storing updated data values in entries of different ways and for which said entries of different ways are all in said first bank of entries; and
said second group of pending write requests comprising pending write requests which are for storing updated data values in entries of different ways and for which said entries of different ways are all in said second bank of entries.

23. A data array for storing data comprising:
at least one bank, each bank comprising a plurality of ways, each way comprising a plurality of entries for storing data values, wherein said data values are identified by addresses;
access control means for controlling storage of data values in said entries, wherein in response to a write request identifying an updated data value to be stored in the data array and a target address identifying the updated data value, said access control means is configured to store the updated data value in one of a corresponding set of entries comprising entries selected from each of said plurality of ways based on said target address;
update queue means for storing update information representing a plurality of pending write requests; and
selecting means for selecting update information from said update queue for a group of at least two pending write requests for storing updated data values in entries of different ways within the same bank;
wherein in response to said update information selected by said selecting means, said access control means is configured to perform said group of at least two pending write requests in parallel to store said updated data values in said entries of said different ways within the same bank.

24. A method of storing data in a data array comprising at least one bank, each bank comprising a plurality of ways, each way comprising a plurality of entries for storing data values, wherein said data values are identified by addresses, the method comprising:
storing in an update queue update information representing a plurality of pending write requests, each pending write request identifying an updated data value to be stored in the data array and a target address identifying the updated data value, wherein the updated data value is storable in any of a corresponding set of entries comprising entries selected from each of said plurality of ways based on said target address;
selecting update information from said update queue for a group of at least two pending write requests for storing updated data values in entries of different ways within the same bank; and
in response to the selected update information, performing said group of at least two pending write requests in parallel to store said updated data values in said entries of different ways within the same bank.

* * * * *